(12) United States Patent
Zhang et al.

(10) Patent No.: US 10,044,573 B2
(45) Date of Patent: Aug. 7, 2018

(54) METHOD, APPARATUS, AND SYSTEM FOR MONITORING QUALITY OF OTT VIDEO

(71) Applicant: Huawei Technologies Co., Ltd., Shenzhen, Guangdong (CN)

(72) Inventors: Jinhui Zhang, Nanjing (CN); Youqing Yang, Nanjing (CN); Lu Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 14/943,949

(22) Filed: Nov. 17, 2015

(65) Prior Publication Data

US 2016/0073105 A1 Mar. 10, 2016

Related U.S. Application Data

(63) Continuation of application No. PCT/CN2014/076833, filed on May 6, 2014.

(30) Foreign Application Priority Data

May 22, 2013 (CN) .......................... 2013 1 0192442

(51) Int. Cl.
*H04L 12/24* (2006.01)
*H04N 17/00* (2006.01)
(Continued)

(52) U.S. Cl.
CPC .......... *H04L 41/5067* (2013.01); *H04L 65/80* (2013.01); *H04N 17/004* (2013.01);
(Continued)

(58) Field of Classification Search
CPC ........... H04N 21/238; H04N 21/25808; H04N 21/23805; H04N 21/2402; H04L 65/80; H04L 41/5067; H04L 65/4069
See application file for complete search history.

(56) References Cited

U.S. PATENT DOCUMENTS 9,479,807 B1 * 10/2016 Bugajski ............ H04N 21/2402
2011/0007648 A1 1/2011 Liu et al.
(Continued)

FOREIGN PATENT DOCUMENTS

CN 101577631 A 11/2009
CN 101841544 A 9/2010
(Continued)

OTHER PUBLICATIONS

Igakura, et al, A Service-Aware Quality Measurement and Management based on Application-Oriented Networking, The Institute of Electronics, Information and Communication Engineers Technical Report, The Institute of Electronics, Information and Communication Engineers, Jan. 11, 2002, vol. 101, No. 59, p. 51-56.

*Primary Examiner* — Raj K Jain

(57) ABSTRACT

The present invention discloses a method, an apparatus, and a system for monitoring quality of an OTT video, which can implement monitoring of quality of an OTT video in a convenient manner. An OTT video monitoring apparatus intercepts a message sent by an OTT video terminal to an OTT video source for requesting to watch an OTT video; sends a response message to the OTT video terminal, where the response message carries a monitoring instruction, so that the OTT video terminal obtains identifier information of the OTT video according to the monitoring instruction; the OTT video monitoring apparatus obtains the identifier information of the OTT video from the OTT video terminal; and monitors quality of the OTT video according to the identifier information of the OTT video.

13 Claims, 4 Drawing Sheets

(51) Int. Cl.
*H04L 29/06* (2006.01)
*H04N 21/24* (2011.01)
*H04N 21/442* (2011.01)

(52) U.S. Cl.
CPC ... *H04N 21/2402* (2013.01); *H04N 21/44204* (2013.01); *H04N 21/44209* (2013.01)

(56) References Cited

U.S. PATENT DOCUMENTS

| | | | |
|---|---|---|---|
| 2011/0038270 A1 | 2/2011 | Martin et al. | |
| 2011/0161402 A1 | 6/2011 | Anderson et al. | |
| 2012/0117225 A1 | 5/2012 | Kordasiewicz et al. | |
| 2012/0131601 A1* | 5/2012 | McDysan | H04N 21/23805 725/1 |
| 2012/0131622 A1* | 5/2012 | McDysan | H04N 21/222 725/95 |
| 2012/0311126 A1* | 12/2012 | Jadallah | H04L 41/5067 709/224 |
| 2014/0115062 A1 | 4/2014 | Liu et al. | |
| 2014/0237112 A1 | 8/2014 | Chen | |
| 2015/0026749 A1 | 1/2015 | Bringuier et al. | |
| 2015/0326898 A1 | 11/2015 | Yang et al. | |
| 2016/0073105 A1* | 3/2016 | Zhang | H04N 17/004 348/180 |

FOREIGN PATENT DOCUMENTS

| | | |
|---|---|---|
| CN | 102036187 A | 4/2011 |
| CN | 102136962 A | 7/2011 |
| CN | 102292959 A | 12/2011 |
| CN | 103067749 A | 4/2013 |
| CN | 103095517 A | 5/2013 |
| CN | 103974057 A | 8/2014 |
| JP | 2003250139 | 9/2003 |
| JP | 2005102049 | 4/2005 |
| JP | 2005217697 | 8/2005 |
| JP | 2006217470 | 8/2006 |
| JP | 2006319619 A | 11/2006 |
| JP | 2009141887 | 6/2009 |
| JP | 2009296203 A | 12/2009 |
| JP | 2015512205 | 4/2015 |
| KR | 20060112075 A | 10/2006 |
| KR | 100822852 B1 | 4/2008 |
| WO | WO 2012/103726 A1 | 8/2012 |
| WO | WO 2012/167416 A1 | 12/2012 |
| WO | WO 2013/064115 A1 | 5/2013 |

* cited by examiner

METHOD, APPARATUS, AND SYSTEM FOR MONITORING QUALITY OF OTT VIDEO

CROSS-REFERENCE TO RELATED APPLICATIONS

This application is a continuation of International Application No. PCT/CN2014/076833, filed on May 6, 2014, which claims priority to Chinese Patent Application No. 201310192442.6, filed on May 22, 2013, both of which are hereby incorporated by reference in their entireties.

TECHNICAL FIELD

The present invention relates to the field of the Internet, and in particular, to a method, an apparatus, and a system for monitoring quality of an OTT video.

BACKGROUND

Recently, an over-the-top (OTT) video service borne on the Internet develops rapidly. Such a video service is also referred to as an OTT video, which refers to a video service based on the Internet. However, the OTT video often has problems, such as a startup delay of a picture, picture freezing, and poor screen resolution, during playback, which affects user experience. Therefore, in practice, quality of the OTT video is often monitored, the quality of the OTT video is evaluated, and a reason why the quality of the OTT video becomes poor is analyzed, so as to improve user experience.

An existing method for monitoring quality of an OTT video is: installing a log file in a web accelerator, installing a quality-of-experience agent (QoE Agent) on a communications network, and installing a video player plug-in in an OTT video terminal, where the video player plug-in monitors viewing experience of a user, and provides monitoring information for the web accelerator and the QoE Agent, so that the web accelerator and the QoE Agent monitor the quality of the OTT video.

However, this method requires installation of a log file in a web accelerator, installation of a quality-of-experience agent on a communications network, and installation of a video player plug-in in an OTT terminal, and therefore has a complex implementation manner.

SUMMARY

Embodiments of the present invention provide a method, an apparatus, and a system for monitoring quality of an over-the-top OTT video, which can implement monitoring of quality of an OTT video in a convenient manner.

The embodiments of the present invention use the following technical solutions:

According to a first aspect, a method for monitoring quality of an OTT video is provided, including:

intercepting, by an OTT video monitoring apparatus, a message sent by an OTT video terminal to an OTT video source for requesting to watch an OTT video; sending, by the OTT video monitoring apparatus, a response message to the OTT video terminal, where the response message carries a monitoring instruction, so that the OTT video terminal obtains identifier information of the OTT video according to the monitoring instruction; obtaining, by the OTT video monitoring apparatus, the identifier information of the OTT video from the OTT video terminal; and monitoring, by the OTT video monitoring apparatus, quality of the OTT video according to the identifier information of the OTT video.

According to a second aspect, a method for monitoring quality of an over-the-top OTT video is provided, including:

sending, by an OTT video terminal, a message for requesting to watch an OTT video to an OTT video source, where the message for requesting to view the OTT video is intercepted by an OTT video monitoring apparatus; receiving, by the OTT video terminal, a response message sent by the OTT video monitoring apparatus, where the response message carries a monitoring instruction; acquiring, by the OTT video terminal, identifier information of the OTT video according to the monitoring instruction; and sending, by the OTT video terminal, the identifier information of the OTT video to the OTT video monitoring apparatus, so that the OTT video monitoring apparatus monitors quality of the OTT video according to the identifier information of the OTT video.

According to a third aspect, an over-the-top OTT video monitoring apparatus is provided, including:

an intercepting unit, configured to intercept a message sent by an OTT video terminal to an OTT video source for requesting to watch an OTT video; a sending unit, configured to send a response message to the OTT video terminal, where the response message carries a monitoring instruction, so that the OTT video terminal obtains identifier information of the OTT video according to the monitoring instruction; an obtaining unit, configured to obtain the identifier information of the OTT video from the OTT video terminal; and a monitoring unit, configured to monitor quality of the OTT video according to the identifier information of the OTT video.

According to a fourth aspect, an over-the-top OTT video terminal is provided, including:

a first sending unit, configured to send a message for requesting to watch an OTT video to an OTT video source, where the message for requesting to view the OTT video is intercepted by an OTT video monitoring apparatus; a receiving unit, configured to receive a response message sent by the OTT video monitoring apparatus, where the response message carries a monitoring instruction; an obtaining unit, configured to obtain identifier information of the OTT video according to the monitoring instruction; and a second sending unit, configured for the OTT video terminal to send the identifier information of the OTT video to the OTT video monitoring apparatus, so that the OTT video monitoring apparatus monitors quality of the OTT video according to the identifier information of the OTT video.

According to a fifth aspect, a system for monitoring quality of an over-the-top OTT video is provided, including the OTT video monitoring apparatus provided in the third aspect and the OTT video terminal provided in the fourth aspect.

Based on the foregoing technical solutions, according to the method, the apparatus, and the system for monitoring quality of an OTT video in the embodiments of the present invention, a message sent by an OTT video terminal to an OTT video source for requesting to watch an OTT video is intercepted; a response message carrying a monitoring instruction is sent to the OTT video terminal, so that the OTT video terminal obtains identifier information of the OTT video according to the monitoring instruction; and after the identifier information of the OTT video is obtained from the OTT video terminal, quality of the OTT video is monitored according to the identifier information of the OTT video. In the embodiments of the present invention, by applying an OTT video monitoring apparatus, monitoring of quality of an OTT video is implemented without the need for deployment in a web accelerator and an OTT terminal, thereby implementing the monitoring of the quality of the OTT video in a convenient manner.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings. It should be understood that the specific embodiments described herein are merely used to explain the present invention but are not intended to limit the present invention.

In the embodiments of the present invention, OTT refers in general to an application or a service borne on the Internet. In the embodiments of the present invention, an OTT video source can provide an OTT video for an OTT video terminal, for example, the OTT video source may be an OTT video website or a video storage apparatus.

Figure 1:
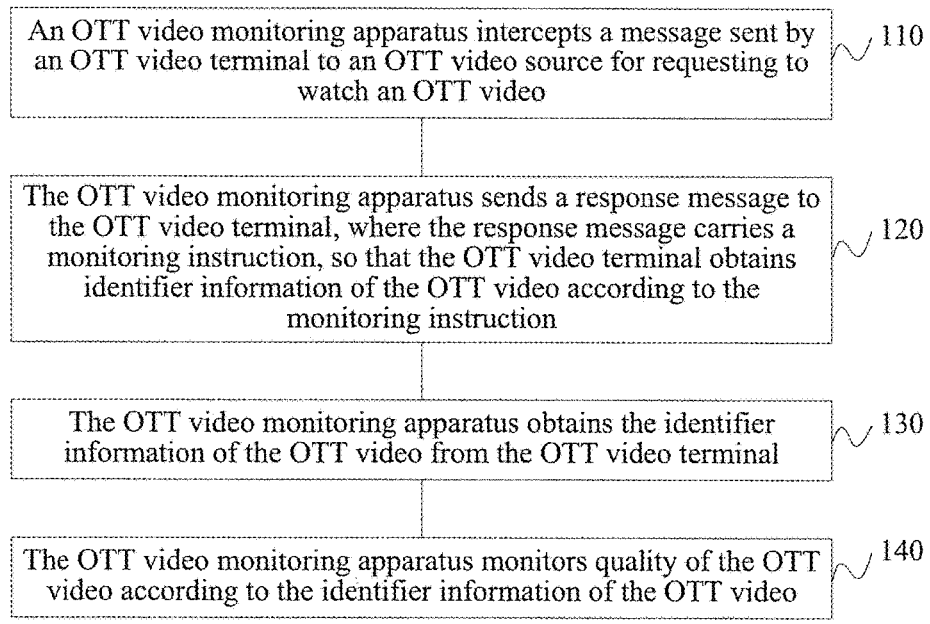
FIG. 1 is a flowchart of a method for monitoring quality of an OTT video according to an embodiment of the present invention.

An embodiment of the present invention provides a method for monitoring quality of an OTT video. As shown in FIG. 1, the method may include:

110: An OTT video monitoring apparatus intercepts a message sent by an OTT video terminal to an OTT video source for requesting to watch an OTT video.

Optionally, the message for requesting to watch an OTT video may be a Hypertext Transfer Protocol (HTTP) uplink request.

120: The OTT video monitoring apparatus sends a response message to the OTT video terminal, where the response message carries a monitoring instruction, so that the OTT video terminal obtains identifier information of the OTT video according to the monitoring instruction.

In this embodiment of the present invention, after intercepting the message sent by the OTT video terminal to the OTT video source for requesting to watch the OTT video, the OTT video monitoring apparatus masquerades as the OTT video source to send the response message carrying the monitoring instruction to the OTT video terminal.

Optionally, the identifier information of the OTT video may be quintuple information of the OTT video, where the quintuple information includes a protocol type, a source IP address, a destination IP address, a source port number, and a destination port number.

Optionally, the OTT video monitoring apparatus obtains play control information of the OTT video from the OTT video terminal. The play control information of the OTT video may be an operation that is performed by a user when the user watches the OTT video and that is recorded by the OTT video terminal, for example, an operation such as pause, play, fast forward, or rewind performed by the user when the user watches the OTT video.

Optionally, the monitoring instruction may be code for monitoring quality of the OTT video.

Optionally, the response message may further carry an instruction for obtaining the OTT video, so that the OTT video terminal obtains the OTT video from the OTT video source or a transparent cache (TC) according to the instruction for obtaining the OTT video.

Optionally, the instruction for obtaining the OTT video may be code of the OTT video source or code of the TC. The OTT video terminal obtains the OTT video from the OTT video source by applying the code of the OTT video source, or the OTT video terminal obtains the OTT video from the TC by applying the code of the TC.

130: The OTT video monitoring apparatus obtains the identifier information of the OTT video from the OTT video terminal.

Optionally, the OTT video monitoring apparatus may further obtain the play control information of the OTT video from the OTT video terminal.

140: The OTT video monitoring apparatus monitors quality of the OTT video according to the identifier information of the OTT video.

Optionally, in this embodiment of the present invention, the OTT video monitoring apparatus may copy, from a network, traffic of the OTT video according to the identifier information of the OTT video, and analyze and monitor the quality of the OTT video.

Optionally, the OTT video monitoring apparatus may send a result of monitoring the quality of the OTT video and/or the play control information of the OTT video to a network management system (NMS).

The OTT video monitoring apparatus may be located on an Internet communications network, for example, the OTT video monitoring apparatus may be an OTT video monitoring probe.

According to the method for monitoring quality of an OTT video in this embodiment of the present invention, a message sent by an OTT video terminal to an OTT video source for requesting to watch an OTT video is intercepted; a response message carrying a monitoring instruction is sent to the OTT video terminal, so that the OTT video terminal obtains identifier information of the OTT video according to the monitoring instruction; and after the identifier information of the OTT video is obtained from the OTT video terminal, quality of the OTT video is monitored according to the identifier information of the OTT video. In this embodiment of the present invention, by applying an OTT video monitoring apparatus, monitoring of quality of an OTT video is implemented without the need for deployment in a web accelerator and an OTT terminal, thereby implementing the monitoring of the quality of the OTT video in a convenient manner.

Figure 2:
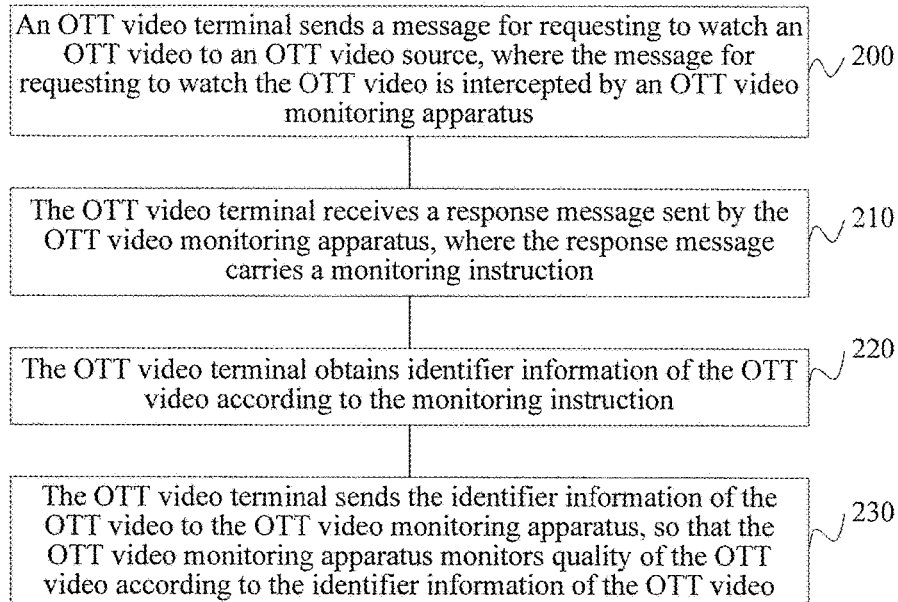
FIG. 2 is a flowchart of another method for monitoring quality of an OTT video according to an embodiment of the present invention.

An embodiment of the present invention provides another OTT video monitoring method. As shown in FIG. 2, the method may include:

200: An OTT video terminal sends a message for requesting to watch an OTT video to an OTT video source, where the message for requesting to view the OTT video is intercepted by an OTT video monitoring apparatus.

For example, the message for requesting to view the OTT video may be the message intercepted by the OTT video monitoring apparatus in step 110 in the foregoing embodiment.

210: The OTT video terminal receives a response message sent by the OTT video monitoring apparatus, where the response message carries a monitoring instruction.

For example, the response message may be the response message sent by the OTT video monitoring apparatus to the OTT video terminal in step 120 in the foregoing embodiment.

Optionally, the response message may further carry an instruction for obtaining the OTT video, so that the OTT video terminal obtains the OTT video from the OTT video source or a TC according to the instruction for obtaining the OTT video.

220: The OTT video terminal obtains identifier information of the OTT video according to the monitoring instruction.

Specifically, the identifier information of the OTT video includes quintuple information of an OTT video stream, where the quintuple information includes a protocol type, a source IP address, a destination IP address, a source port number, and a destination port number.

Optionally, the OTT video terminal may further obtain play control information of the OTT video according to the monitoring instruction, where the play control information of the OTT video may be an operation that is performed by a user when the user watches the OTT video and that is recorded by the OTT video terminal, for example, an operation such as pause, play, fast forward, or rewind performed by the user when the user watches the OTT video.

Optionally, the OTT video terminal sends the play control information of the OTT video to the OTT video monitoring apparatus.

230: The OTT video terminal sends the identifier information of the OTT video to the OTT video monitoring apparatus, so that the OTT video monitoring apparatus monitors quality of the OTT video according to the identifier information of the OTT video.

Optionally, the OTT video terminal may send the identifier information of the OTT video directly to the OTT video monitoring apparatus, or the OTT video terminal may also send the identifier information of the OTT video to the OTT video monitoring apparatus by using a NMS.

Optionally, the OTT video terminal may further send the play control information of the OTT video to the OTT video monitoring apparatus.

Optionally, in this embodiment of the present invention, the OTT video terminal may be user equipment having a video playback function, such as a television, a mobile phone, or a computer.

According to the OTT video monitoring method in this embodiment of the present invention, a message sent by an OTT video terminal to an OTT video source for requesting to watch an OTT video is intercepted by an OTT video monitoring apparatus, and the OTT video terminal receives a response message from the OTT video monitoring apparatus, and sends identifier information of the OTT video to the OTT video monitoring apparatus, so that the OTT video monitoring apparatus monitors quality of the OTT video by using the identifier information; therefore, the monitoring of the quality of the OTT video can be implemented in a convenient manner without the need for deployment in a web accelerator and the OTT terminal.

Figure 3:
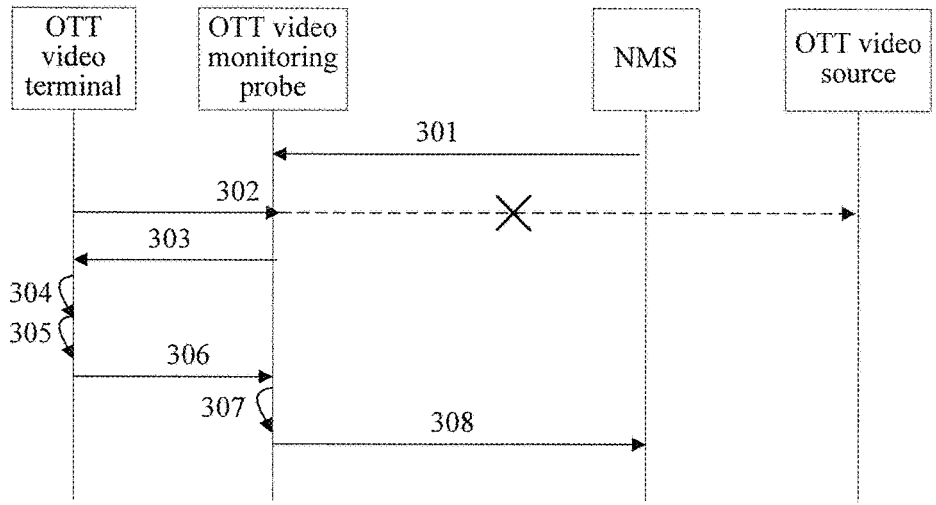
FIG. 3 is a flowchart of still another method for monitoring quality of an OTT video according to an embodiment of the present invention.

A specific implementation process of the OTT video monitoring method in this embodiment of the present invention is described in detail below by using an example in which the OTT video monitoring apparatus is an OTT video monitoring probe with reference to an interaction procedure shown in FIG. 3. In FIG. 3, an OTT video monitoring probe is an OTT video monitoring apparatus, an NMS is a network management system, and an OTT video source may be an OTT video website, a video storage apparatus, or the like.

301: The NMS sends a video monitoring notification to the OTT video monitoring probe, where the video monitoring notification carries identifier information of an OTT video terminal and identifier information of the OTT video source.

The identifier information of the OTT video terminal includes: an Internet Protocol (I IP) address or a Media Access Control (MAC) address of the OTT video terminal, a physical interface through which the OTT video terminal is connected to a network, or the like; and the identifier information of the OTT video source includes: a domain name of a website, an IP address of a website, or the like.

302: The OTT video monitoring probe intercepts, according to the identifier information of the OTT video terminal and the identifier information of the OTT video source, a message sent by the OTT video terminal to the OTT video source for requesting to watch an OTT video.

303: The OTT video monitoring probe sends a response message to the OTT video terminal, where the response message carries a monitoring instruction.

In this example, the OTT video monitoring probe masquerades as the OTT video source to send the response message to the OTT video terminal.

Preferably, after the OTT video monitoring probe sends the response message to the OTT video terminal, the OTT video monitoring probe may stop monitoring the message sent by the OTT video terminal.

304: The OTT video terminal receives the response message sent by the OTT video monitoring probe.

305: The OTT video terminal obtains identifier information of the OTT video and play control information of the OTT video according to the monitoring instruction.

306: The OTT video terminal sends the identifier information of the OTT video and the play control information of the OTT video to the OTT video monitoring probe.

307: The OTT video monitoring probe monitors quality of the OTT video according to the identifier information of the OTT video.

308: The OTT video monitoring probe sends a result of monitoring the quality of the OTT video and/or the play control information of the OTT video to the NMS.

According to the method for monitoring quality of an OTT video provided by this embodiment of the present invention, a message sent by an OTT video terminal to an OTT video source for requesting to watch an OTT video is intercepted, a response message carrying a monitoring instruction is sent to the OTT video terminal, identifier information, sent by the OTT video terminal, of the OTT video is obtained, and quality of the OTT video is monitored by using the identifier information; therefore, the monitoring of the quality of the OTT video can be implemented in a convenient manner without the need for deployment in a web accelerator and the OTT terminal.

Figure 4:
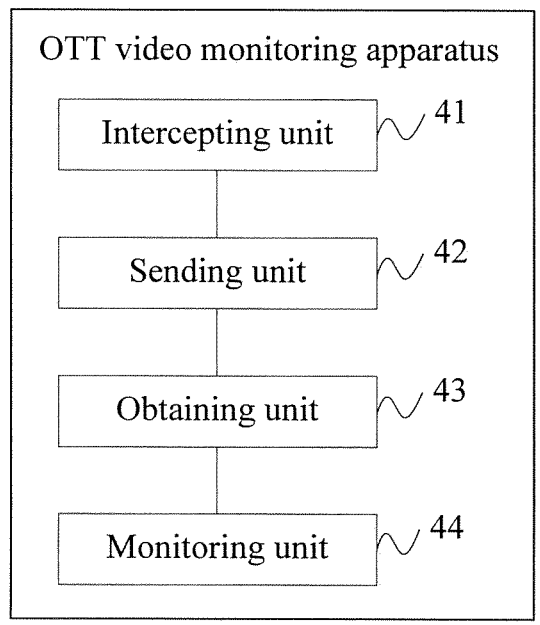
FIG. 4 is a schematic structural diagram of an OTT video monitoring apparatus according to an embodiment of the present invention.

As shown in FIG. 4, an embodiment of the present invention provides an OTT video monitoring apparatus, including: an intercepting unit 41, a sending unit 42, an obtaining unit 43, and a monitoring unit 44, where the intercepting unit 41 is configured to intercept a message sent by an OTT video terminal to an OTT video source for requesting to watch an OTT video;

the sending unit 42 is configured to send a response message to the OTT video terminal, where the response message carries a monitoring instruction, so that the OTT video terminal obtains identifier information of the OTT video according to the monitoring instruction;

the obtaining unit 43 is configured to obtain the identifier information of the OTT video from the OTT video terminal; and the monitoring unit 44 is configured to monitor quality of the OTT video according to the identifier information of the OTT video.

Optionally, the identifier information of the OTT video includes quintuple information of the OTT video, where the quintuple information may include a protocol type, a source IP address, a destination IP address, a source port number, and a destination port number.

Optionally, the obtaining unit 43 may be further configured to obtain play control information of the OTT video from the OTT video terminal, where the play control information of the OTT video may be an operation that is performed by a user when the user watches the OTT video and that is recorded by the OTT video terminal, for example, an operation such as pause, play, fast forward, or rewind performed by the user when the user watches the OTT video.

The OTT video monitoring apparatus provided by this embodiment of the present invention may be located on an Internet communications network, and the OTT video monitoring apparatus may be an OTT video monitoring probe or the like. In addition, functions of units in the OTT video monitoring apparatus are only described briefly, and for detailed description, refer to the foregoing corresponding method embodiment. The OTT video monitoring apparatus can execute the foregoing corresponding method embodiment.

According to the OTT video monitoring apparatus provided by this embodiment of the present invention, a message sent by an OTT video terminal to an OTT video source for requesting to watch an OTT video is intercepted; a response message carrying a monitoring instruction is sent to the OTT video terminal, so that the OTT video terminal obtains identifier information of the OTT video according to the monitoring instruction; and after the identifier information of the OTT video is obtained from the OTT video terminal, quality of the OTT video is monitored according to the identifier information of the OTT video. In this embodiment of the present invention, by applying an OTT video monitoring apparatus, monitoring of quality of an OTT video is implemented without the need for deployment in a web accelerator and an OTT terminal, thereby implementing the monitoring of the quality of the OTT video in a convenient manner.

Figure 5:
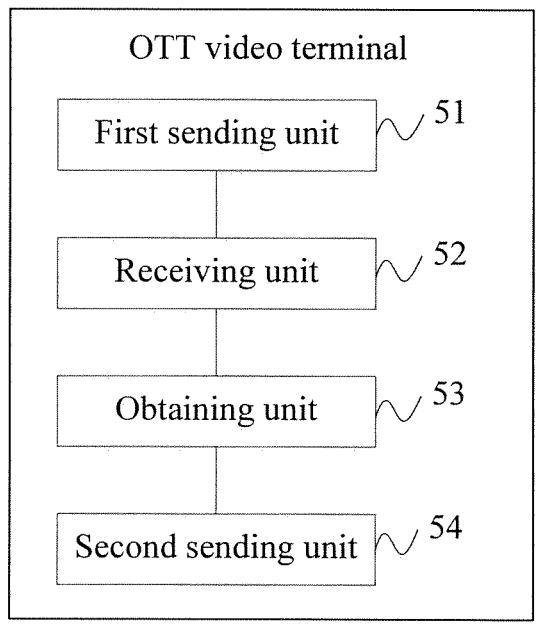
FIG. 5 is a schematic structural diagram of an OTT video terminal according to an embodiment of the present invention.

As shown in FIG. 5, an embodiment of the present invention provides an OTT video terminal, including: a first sending unit 51, a receiving unit 52, an obtaining unit 53, and a second sending unit 54, where the first sending unit 51 is configured to send a message for requesting to watch an OTT video to an OTT video source, where the message for requesting to view the OTT video is intercepted by an OTT video monitoring apparatus;

the receiving unit 52 is configured to receive a response message sent by the OTT video monitoring apparatus, where the response message carries a monitoring instruction;

the obtaining unit 53 is configured to obtain identifier information of the OTT video according to the monitoring instruction; and the second sending unit 54 is configured to send the identifier information of the OTT video to the OTT video monitoring apparatus, so that the OTT video monitoring apparatus monitors quality of the OTT video according to the identifier information of the OTT video.

Optionally, the identifier information of the OTT video includes quintuple information of the OTT video, where the quintuple information may include a protocol type, a source IP address, a destination IP address, a source port number, and a destination port number.

Optionally, the second sending unit 54 may be further configured to send play control information of the OTT video to the OTT video monitoring apparatus, where the play control information of the OTT video may be an operation that is performed by a user when the user watches the OTT video and that is recorded by the OTT video terminal, for example, an operation such as pause, play, fast forward, or rewind performed by the user when the user watches the OTT video.

The OTT video terminal provided by this embodiment of the present invention may be user equipment having a video playback function, such as a television, a mobile phone, or a computer. In addition, functions of units in the OTT video terminal are only described briefly, and for detailed description, refer to the foregoing corresponding method embodiment. The OTT video terminal can execute corresponding steps in the foregoing corresponding method embodiment.

According to the OTT video terminal provided by this embodiment of the present invention, a message that is for requesting to watch an OTT video and is sent to an OTT video source is intercepted by an OTT video monitoring apparatus, and the OTT video terminal receives a response message from the OTT video monitoring apparatus, and sends identifier information of the OTT video to the OTT video monitoring apparatus, so that the OTT video monitoring apparatus monitors quality of the OTT video by using the identifier information; therefore, the monitoring of the quality of the OTT video can be implemented in a convenient manner without the need for deployment in a web accelerator and the OTT terminal.

Figure 6:
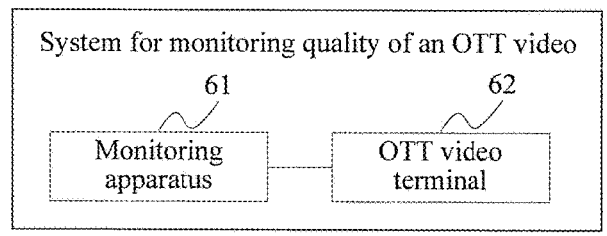
FIG. 6 is a schematic structural diagram of a system for monitoring quality of an OTT video according to an embodiment of the present invention.

As shown in FIG. 6, an embodiment of the present invention provides a system for monitoring quality of an OTT video, which may include an OTT video monitoring apparatus 61 and an OTT video terminal 62.

The OTT video monitoring apparatus 61 is configured to intercept a message sent by an OTT video terminal to an OTT video source for requesting to watch an OTT video; send a response message to the OTT video terminal, where the response message carries a monitoring instruction, so that the OTT video terminal obtains identifier information of the OTT video according to the monitoring instruction; obtain the identifier information of the OTT video from the OTT video terminal; and monitor quality of the OTT video according to the identifier information of the OTT video.

The OTT video terminal 62 is configured to send the message for requesting to view the OTT video to the OTT video source, where the message for requesting to view the OTT video is intercepted by the OTT video monitoring apparatus; receive the response message sent by the OTT video monitoring apparatus, where the response message carries the monitoring instruction; obtain the identifier information of the OTT video according to the monitoring instruction; and send the identifier information of the OTT video to the OTT video monitoring apparatus, so that the OTT video monitoring apparatus monitors the quality of the OTT video according to the identifier information of the OTT video.

Optionally, component units of the OTT video monitoring apparatus 61 and specific functions of the units may be the same as those in the foregoing embodiment of the OTT video monitoring apparatus, and reference may be made thereto. Component units of the OTT video terminal 62 and specific functions of the units may be the same as those in the foregoing embodiment of the OTT video terminal, and details are not described herein again.

According to the system for monitoring quality of an OTT video in this embodiment of the present invention, the OTT video monitoring apparatus 61 may be located on an Internet communications network, and the OTT video monitoring apparatus 61 may be an OTT video monitoring probe or the like; and the OTT video terminal 62 may be user equipment having a video playback function, such as a television, a mobile phone, or a computer.

According to the system for monitoring quality of an OTT video in this embodiment of the present invention, an OTT video monitoring apparatus intercepts a message sent by an OTT video terminal to an OTT video source for requesting to watch an OTT video; the OTT video monitoring apparatus sends a response message carrying a monitoring instruction to the OTT video terminal; the OTT video terminal obtains identifier information of the OTT video according to the monitoring instruction; and after obtaining the identifier information of the OTT video from the OTT video terminal, the OTT video monitoring apparatus monitors quality of the OTT video according to the identifier information of the OTT video. In this embodiment of the present invention, by applying an OTT video monitoring apparatus, monitoring of quality of an OTT video is implemented without the need for deployment in a web accelerator and an OTT terminal, thereby implementing the monitoring of the quality of the OTT video in a convenient manner.

Figure 7:
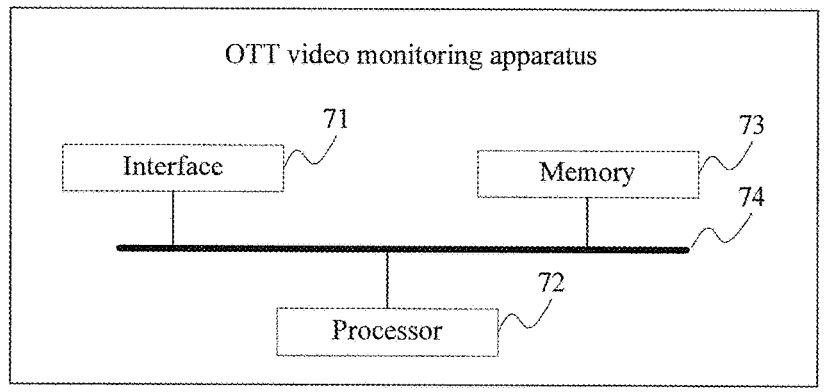
FIG. 7 is a schematic structural diagram of another OTT video monitoring apparatus according to an embodiment of the present invention.

As shown in FIG. 7, an embodiment of the present invention provides another OTT video monitoring apparatus, where the apparatus may include: a bus 74, and an interface 71, a processor 72, and a memory 73 that are connected to the bus 74.

The processor 72 executes an instruction in the memory 73 and is configured to intercept a message sent by an OTT video terminal to an OTT video source for requesting to watch an OTT video.

The interface 71 is configured to send a response message to the OTT video terminal, where the response message carries a monitoring instruction, so that the OTT video terminal obtains identifier information of the OTT video according to the monitoring instruction.

The interface 71 is further configured to obtain the identifier information of the OTT video from the OTT video terminal.

The processor 72 executes an instruction in the memory 73 and is further configured to monitor quality of the OTT video according to the identifier information of the OTT video.

According to the OTT video monitoring apparatus in this embodiment of the present invention, a message sent by an OTT video terminal to an OTT video source for requesting to watch an OTT video is intercepted; a response message carrying a monitoring instruction is sent to the OTT video terminal, so that the OTT video terminal obtains identifier information of the OTT video according to the monitoring instruction; and after the identifier information of the OTT video is obtained from the OTT video terminal, quality of the OTT video is monitored according to the identifier information of the OTT video. In this embodiment of the present invention, by applying an OTT video monitoring apparatus, monitoring of quality of an OTT video is implemented without the need for deployment in a web accelerator and an OTT terminal, thereby implementing the monitoring of the quality of the OTT video in a convenient manner.

Figure 8:
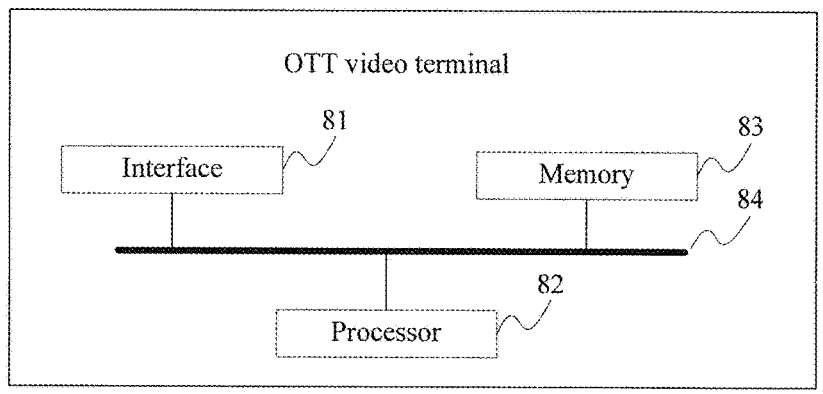
FIG. 8 is a schematic structural diagram of another OTT video terminal according to an embodiment of the present invention.

As shown in FIG. 8, an embodiment of the present invention provides another OTT video terminal, where the terminal may include: a bus 84, and an interface 81, a processor 82, and a memory 83 that are connected to the bus 84.

The interface 81 is configured to send a message for requesting to watch an OTT video to an OTT video source, where the message for requesting to view the OTT video is intercepted by an OTT video monitoring apparatus.

The interface 81 is further configured to receive a response message sent by the OTT video monitoring apparatus, where the response message carries a monitoring instruction.

The processor 82 executes an instruction in the memory 83 and is configured to obtain identifier information of the OTT video according to the monitoring instruction.

The interface 81 is further configured to send the identifier information of the OTT video to the OTT video monitoring apparatus, so that the OTT video monitoring apparatus monitors quality of the OTT video according to the identifier information of the OTT video.

According to the OTT video terminal in this embodiment of the present invention, a message that is for requesting to watch an OTT video and is sent to an OTT video source is intercepted by an OTT video monitoring apparatus, and the OTT video terminal receives a response message from the OTT video monitoring apparatus, and sends identifier information of the OTT video to the OTT video monitoring apparatus, so that the OTT video monitoring apparatus monitors quality of the OTT video by using the identifier information; therefore, the monitoring of the quality of the OTT video can be implemented in a convenient manner without the need for deployment in a web accelerator and the OTT terminal.

In this specification, for same or similar parts of the embodiments, reference may be made to each other, and description of each embodiment focuses on differences from other embodiments. Especially, for the apparatus embodiments, for related parts, reference may be made to partial description in the method embodiments. The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

A person of ordinary skill in the art may be aware that, in combination with the examples described in the embodiments disclosed in this specification, units and algorithm steps may be implemented by electronic hardware or a combination of computer software and electronic hardware.

Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method for monitoring quality of an over-the-top (OTT) video, the method comprising:
    intercepting, by an OTT video monitoring apparatus, a message sent by an OTT video terminal to an OTT video source for requesting to watch an OTT video;
    sending, by the OTT video monitoring apparatus, a response message to the OTT video terminal, wherein the response message carries a monitoring instruction to cause the OTT video terminal to obtain identifier information of the OTT video;
    obtaining, by the OTT video monitoring apparatus, the identifier info illation of the OTT video from the OTT video terminal, wherein the identifier information of the OTT video comprises quintuple information of the OTT video; and
    monitoring, by the OTT video monitoring apparatus, quality of the OTT video according to the identifier information of the OTT video.

2. The method according to claim 1, further comprising:
    obtaining, by the OTT video monitoring apparatus, play control information of the OTT video from the OTT video terminal.

3. The method according to claim 1, wherein the play control information of the OTT video comprises: an operation performed by a user when the user watches the OTT video.

4. The method according to claim 1, wherein the monitoring comprises:
    copying, from a network, traffic of the OTT video according to the identifier information of the OTT video; and
    analyzing and monitoring the quality of the OTT video.

5. A method for monitoring quality of an over-the-top (OTT) video, the method comprising:
    sending, by an OTT video terminal, a message for requesting to watch an OTT video to an OTT video source, wherein the message for requesting to watch the OTT video is intercepted by an OTT video monitoring apparatus;
    receiving, by the OTT video terminal, a response message sent by the OTT video monitoring apparatus, wherein the response message carries a monitoring instruction;
    obtaining, by the OTT video terminal, identifier information of the OTT video according to the monitoring instruction, wherein the identifier information of the OTT video comprises: quintuple information of the OTT video; and
    sending, by the OTT video terminal, the identifier information of the OTT video to the OTT video monitoring apparatus, so that the OTT video monitoring apparatus monitors quality of the OTT video according to the identifier information of the OTT video.

6. The method according to claim 5, further comprising:
    obtaining, by the OTT video terminal, play control information of the OTT video according to the monitoring instruction.

7. The method according to claim 5, wherein the play control information of the OTT video comprises: an operation performed by a user when the user watches the OTT video.

8. The method according to claim 7, further comprising:
    sending, by the OTT video terminal, the play control information of the OTT video to the OTT video monitoring apparatus.

9. An over-the-top (OTT) video monitoring apparatus, comprising:
    an interface;
    a processor;
    a non-transitory computer readable medium which contains computer-executable instructions;
    wherein the processor is configured to execute the computer-executable instructions to intercept a message sent by an OTT video terminal to an OTT video source for requesting to watch an OTT video;
    wherein the interface is configured to:
        send a response message to the OTT video terminal, wherein the response message carries a monitoring instruction to cause the OTT video terminal to obtain identifier information of the OTT video, and
        obtain the identifier information of the OTT video from the OTT video terminal, wherein the identifier information of the OTT video comprises: quintuple information of the OTT video; and
    wherein the processor is further configured to execute the computer-executable instructions to monitor quality of the OTT video according to the identifier information of the OTT video.

10. The OTT video monitoring apparatus according to claim 9, wherein the interface is further configured to obtain play control information of the OTT video from the OTT video terminal.

11. The OTT video monitoring apparatus according to claim 9, wherein the monitoring comprises:
    copying, from a network, traffic of the OTT video according to the identifier information of the OTT video; and
    analyzing and monitoring the quality of the OTT video.

12. An over-the-top (OTT) video terminal, comprising:
    an interface;
    a processor;
    a non-transitory computer readable medium which contains computer-executable instructions;
    wherein the interface is configured to send a message for requesting to watch an OTT video to an OTT video source, wherein the message for requesting to watch the OTT video is intercepted by an OTT video monitoring apparatus, and receive a response message sent by the OTT video monitoring apparatus, wherein the response message carries a monitoring instruction;

wherein the processor is configured to execute the computer-executable instructions to obtain identifier information of the OTT video according to the monitoring instruction, wherein the identifier information of the OTT video comprises quintuple information of the OTT video; and wherein the interface is further configured to send the identifier information of the OTT video to the OTT video monitoring apparatus, so that the OTT video monitoring apparatus monitors quality of the OTT video according to the identifier information of the OTT video.

13. The OTT video terminal according to claim 12, wherein the processor is further configured to obtain play control information of the OTT video according to the monitoring instruction.

* * * * *